United States Patent
Demmig et al.

(10) Patent No.: US 8,404,304 B2
(45) Date of Patent: Mar. 26, 2013

(54) AQUEOUS ONE-COMPONENT DISPERSION PRIMER FOR THE ADHESION OF PLASTIC FILMS BY MEANS OF DISPERSION ADHESIVES

(75) Inventors: Martin Demmig, Quickborn (DE); André Buchholz, Ritterhude (DE); Peter Kühnemund, Frestedt (DE)

(73) Assignee: Sika Technology AG, Baar (CH)

( * ) Notice: Subject to any disclaimer, the term of this patent is extended or adjusted under 35 U.S.C. 154(b) by 728 days.

(21) Appl. No.: 12/087,676

(22) PCT Filed: Mar. 29, 2007

(86) PCT No.: PCT/EP2007/053001
§ 371 (c)(1),
(2), (4) Date: Aug. 1, 2008

(87) PCT Pub. No.: WO2007/113193
PCT Pub. Date: Oct. 11, 2007

(65) Prior Publication Data
US 2009/0017310 A1    Jan. 15, 2009

(30) Foreign Application Priority Data
Mar. 29, 2006 (EP) .................................... 06111932

(51) Int. Cl.
*B05D 5/10* (2006.01)
(52) U.S. Cl. .................. 427/207.1; 427/208.2; 156/60; 156/71; 156/325; 156/331.1; 156/331.7
(58) Field of Classification Search ............... 427/207.1, 427/208, 208.2; 156/60, 71, 325, 331.1, 156/331.7
See application file for complete search history.

(56) References Cited

U.S. PATENT DOCUMENTS 5,824,714 A    10/1998    Broennum et al.
(Continued)

FOREIGN PATENT DOCUMENTS

| DE | 100 01 777 A1 | 8/2000 |
| DE | 100 00 656 A1 | 7/2001 |

(Continued)

OTHER PUBLICATIONS

Mar. 26, 2010 Office Action issued in Russian Application No. 2008131316 (with translation).

(Continued)

*Primary Examiner* — Nathan Empie
*Assistant Examiner* — Xiao Zhao
(74) *Attorney, Agent, or Firm* — Oliff & Berridge, PLC

(57) ABSTRACT

The invention relates to the use of a one-component aqueous polyurethane dispersion composition (PD) as a primer for the adhesion of plastic films (KF) by means of an aqueous one-component polyurethane dispersion adhesive (DK). The aqueous polyurethane dispersion composition (PD) comprises a polyurethane (P1) and carbodiimide groups and/or carboxyl groups, and the polyurethane dispersion adhesive (DK) comprises a polyurethane (P2) and carbodiimide groups, and carboxyl groups such that the aqueous polyurethane dispersion composition (PD) and the aqueous polyurethane dispersion adhesive (DK) react with one another in a polyaddition reaction when heated to a temperature of 50° C. or more. The invention also relates to primer-coated plastic films, to composite bodies produced therefrom and to methods for the production thereof.

10 Claims, 2 Drawing Sheets

U.S. PATENT DOCUMENTS

| | | |
|---|---|---|
| 6,670,406 B2 | 12/2003 | Hofmann et al. |
| 2002/0032242 A1* | 3/2002 | Antonietti et al. ............... 516/98 |
| 2002/0198313 A1 | 12/2002 | Meyer-Roscher et al. |
| 2008/0262131 A1* | 10/2008 | Linnenbrink et al. ........ 524/110 |

FOREIGN PATENT DOCUMENTS

| | | |
|---|---|---|
| EP | 0 801 086 B1 | 8/2002 |
| EP | 1 000 104 B1 | 9/2002 |
| JP | A-63-278988 | 11/1988 |
| JP | A-01-272675 | 10/1989 |
| JP | A-06-336576 | 12/1994 |
| JP | A-07-082533 | 3/1995 |
| JP | A-2001-207070 | 7/2001 |
| JP | A-2003-519704 | 6/2003 |
| RU | 2 177 960 C2 | 2/1999 |
| RU | 2 298 565 C2 | 3/2005 |
| WO | WO 00/11060 | 3/2000 |
| WO | WO 01/34559 A1 | 5/2001 |
| WO | WO 2005/113627 A1 | 12/2005 |

OTHER PUBLICATIONS

Nov. 1, 2011 Office Action issued in Japanese Application No. 2008-555806 (with translation).

* cited by examiner

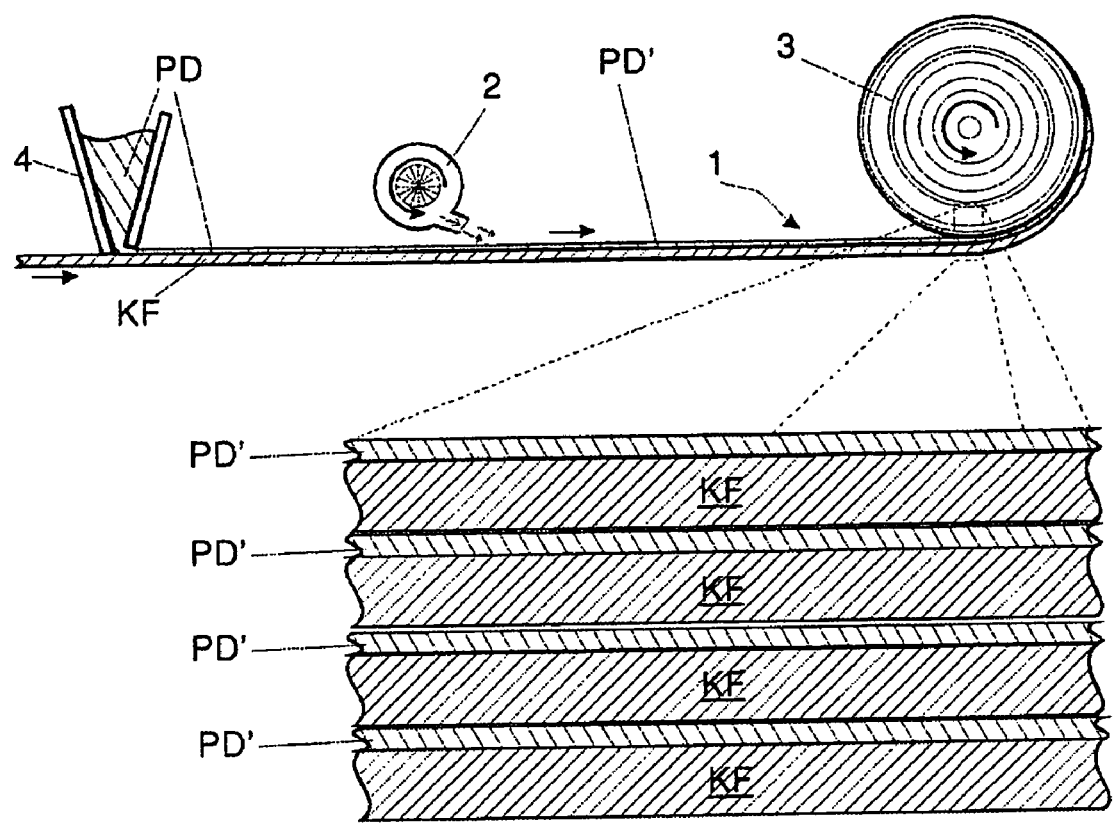
Figure 2)

US 8,404,304 B2

AQUEOUS ONE-COMPONENT DISPERSION PRIMER FOR THE ADHESION OF PLASTIC FILMS BY MEANS OF DISPERSION ADHESIVES

FIELD OF THE INVENTION

The invention relates to the field of aqueous dispersion primer compositions and to the adhesive bonding of plastic films by means of dispersion-based adhesives.

BACKGROUND ART

Aqueous dispersion adhesives are used widely, especially for the bonding of textiles.

For the bonding of films, more particularly decorative films, using dispersion adhesives, the films are typically pretreated with a primer. These primers are based in general on solvents and are therefore disadvantageous from the standpoints of occupational hygiene and safety. Also known are aqueous polyurethane primers which contain sulfonate groups. These primers, however, exhibit weaknesses under climatic and thermal loads, and therefore in many cases lead prematurely to failure of the adhesive bond.

Among aqueous dispersion adhesives a trend has been noted in recent times toward one-component aqueous dispersion adhesives. For instance WO 2005/113627 A1 discloses aqueous one-component dispersion adhesives which are based on a polyurethane containing carboxyl groups and carbodiimide groups or a polyurethane containing carboxyl groups and a carbodiimide.

It has emerged, however, that for these one-component dispersion adhesives as well the use of primers is an advantage. But the known primer systems exhibit the weaknesses mentioned above.

BRIEF DESCRIPTION OF THE INVENTION

It is an object of the present invention, therefore, to eliminate the problems of the prior art and more particularly to provide a method for the reliable adhesive bonding of plastic films by means of aqueous one-component dispersion adhesives.

Surprisingly it has been found that this object can be achieved using an aqueous polyurethane dispersion composition as a primer, in accordance with a first embodiment.

A further aspect of the present invention is a primer-coated plastic film. It has been found that a film coated by applying and flashing off a one-compartment aqueous polyurethane dispersion composition to a plastic film, wherein the polyurethane dispersion composition comprises at least one polyurethane and at least one of carbodiimide groups and carboxyl groups, is tack-free and can be wound without release paper interleaves, and does not lead to instances of sticking of the individual plies and hence can be termed "non-blocking".

Further aspects of the invention are composites comprising a plastic film, a reacted primer obtained from a one-component aqueous polyurethane dispersion composition, a reacted adhesive obtained from a one-component aqueous polyurethane dispersion adhesive, and a substrate, the reacted primer being disposed being disposed between the plastic film and the reacted adhesive, and the reacted adhesive being disposed between the reacted primer and the substrate; and the aqueous polyurethane dispersion composition comprising a polyurethane and at least one of carbodiimide groups and carboxyl groups; and the polyurethane dispersion adhesive comprising a polyurethane and at least one of carbodiimide groups and carboxyl groups; with the consequence that carboxyl groups and the carbodiimide groups react with one another via a polyaddition reaction on heating to a temperature of 50° C., and also methods of producing the composites.

Further advantageous embodiments of the invention will become apparent from the additional descriptions. It is found that with the present invention it is possible to obtain composites, more particularly fiber materials and plastics bonded to films, that exhibit improved climatic and temperature load characteristics.

SOME EMBODIMENTS OF THE INVENTION

The present invention relates on the one hand to the use of a one-component aqueous polyurethane dispersion composition (PD) as a primer for the adhesive bonding of plastic films (KF) by means of an aqueous one-component polyurethane dispersion adhesive (DK).

In this context the aqueous polyurethane dispersion composition (PD) comprises a polyurethane P1 and also carbodiimide groups and/or carboxyl groups, and the polyurethane dispersion adhesive (DK) comprises a polyurethane P2 and also carbodiimide groups and/or carboxyl groups, with the consequence that the aqueous polyurethane dispersion composition (PD) and the aqueous polyurethane dispersion adhesive (DK) react with one another via a polyaddition reaction on heating to a temperature of 50° C. or more.

The carbodiimide groups react with carboxyl groups under the influence of heat.

Accordingly the following different variants are possible:

a) the aqueous polyurethane dispersion composition (PD) contains carbodiimide groups and the aqueous polyurethane dispersion adhesive (DK) contains carboxyl groups b) the aqueous polyurethane dispersion composition (PD) contains carboxyl groups and the aqueous polyurethane dispersion adhesive (DK) contains carbodiimide groups c) the aqueous polyurethane dispersion composition (PD) contains carbodiimide groups and carboxyl groups and the aqueous polyurethane dispersion adhesive (DK) contains carboxyl groups d) the aqueous polyurethane dispersion composition (PD) contains carbodiimide groups and carboxyl groups and the aqueous polyurethane dispersion adhesive (DK) contains carbodiimide groups e) the aqueous polyurethane dispersion composition (PD) contains carbodiimide groups and the aqueous polyurethane dispersion adhesive (DK) contains carbodiimide groups and carboxyl groups f) the aqueous polyurethane dispersion composition (PD) contains carboxyl groups and the aqueous polyurethane dispersion adhesive (DK) contains carbodiimide groups and carboxyl groups g) the aqueous polyurethane dispersion composition (PD) contains carboxyl groups and carbodiimide groups and the aqueous polyurethane dispersion adhesive (DK) contains carbodiimide groups and carboxyl groups.

In order to ensure a polyaddition reaction between the aqueous polyurethane dispersion composition (PD) and the aqueous polyurethane dispersion adhesive (DK) on heating to a temperature of 50° C. or more, care must be taken to ensure, in the case of options c), d), e), and f), i.e., where the polyurethane dispersion composition (PD) and/or the aqueous polyurethane dispersion adhesive (DK) comprises carbodiimide groups and carboxyl groups simultaneously, that the one of these functional groups which is present only in the polyurethane dispersion composition (PD) or only in the aqueous polyurethane dispersion adhesive (DK) is present in each case in a stoichiometric excess relative to the other functional group in the polyurethane dispersion composition (PD) and/or in the polyurethane dispersion adhesive (DK), where both carbodiimide groups and carboxyl groups are present.

Accordingly in c) in the polyurethane dispersion composition (PD) the carbodiimide groups are in a stoichiometric excess over the carboxyl groups;

d) in the polyurethane dispersion composition (PD) the carboxyl groups are in a stoichiometric excess over the carbodiimide groups;

e) in the polyurethane dispersion adhesive (DK) the carboxyl groups are in a stoichiometric excess over the carbodiimide groups;

f) in the polyurethane dispersion adhesive (DK) the carbodiimide groups are in a stoichiometric excess over the carboxyl groups;

In the case of option g) it is necessary for one of the functional groups (carbodiimide groups or carboxyl groups) in each case to be present in a stoichiometric excess in the polyurethane dispersion composition (PD), while this functional group is present in a stoichiometric deficit in the polyurethane dispersion adhesive (DK).

The carboxyl groups are attached preferably to the polyurethane P1 and/or to the polyurethane P2.

The carbodiimide groups are preferably incorporated in the polyurethane P1 and/or in the polyurethane P2.

The preferred carbodiimide group has the formula (I)

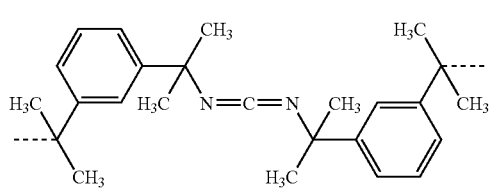

(I)

The carboxyl groups are attached in the polyurethane P1 and/or polyurethane P2.

In one preferred embodiment the aqueous polyurethane dispersion composition (PD) contains carbodiimide groups which are incorporated in a polyurethane P1.

In another preferred embodiment the aqueous polyurethane dispersion composition (PD) contains carboxyl groups which are attached to the polyurethane P1.

The polyurethane P2 which is located in the aqueous polyurethane dispersion adhesive (DK) is on the one hand preferably a polyurethane (PUR-COOH-CDI) which contains both carbodiimide groups and carboxyl groups.

The polyurethane P2 which is in the aqueous polyurethane dispersion adhesive (DK) is on the other hand preferably a polyurethane (PUR-COOH) which contains carboxyl groups. It is preferred for the dispersion adhesive (DK) to comprise a polyurethane (PUR-COOH) of this kind and additionally at least one carbodiimide (CDI) which contains at least one carbodiimide group.

Carbodiimides (CDI) of this kind are compounds which contain at least one carbodiimide group —N═C═N— but no carboxyl groups. Particularly suitable carbodiimides (CDI) are those which contain the structural element of the formula (I)

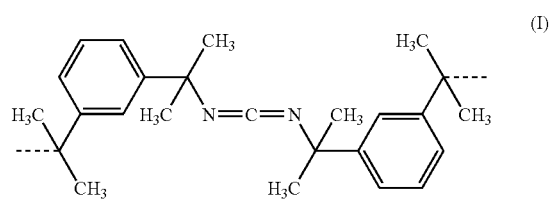

Particularly suitable such carbodiimides (CDI) are, for example, described as "carbodiimides Ibii" in WO 00/11060.

In a further embodiment the polyurethane dispersion composition (PD) comprises at least one carbodiimide (CDI) which contains at least one carbodiimide group, as described above.

In one of the most preferred embodiments the aqueous polyurethane dispersion composition (PD) comprises as polyurethane polymer P1 a polyurethane polymer containing carboxyl groups (PUR-COOH) and the aqueous polyurethane dispersion adhesive (DK) comprises as polyurethane polymer P2 a polyurethane polymer containing carbodiimide groups (PUR-CDI) or a polyurethane polymer containing both carbodiimide groups and carboxyl groups (PUR-COOH-CDI); in the latter case, the carbodiimide groups in the polyurethane polymer (PUR-COOH-CDI) are present in a stoichiometric excess over the carboxyl groups.

The polyurethane polymer P1 and the polyurethane polymer P2 preferably contain no sulfonate groups.

The polyurethane polymers P1 and P2 are prepared in a way which is known to the skilled worker for aqueous dispersions, typically from polyisocyanates and NCO-active compounds such as polyols.

Polyurethanes with carboxyl groups, PUR-COOH, are polyurethanes which contain at least one carboxyl group per macromolecule. Compounds of this kind have been known for a long time and are used in the formulation of aqueous polyurethane dispersions. Typically they are prepared from polyisocyanates and compounds containing carboxyl groups and NCO-active groups, and, if desired, customary polyols, more particularly diols. Compounds of this kind containing carboxyl groups and NCO-active groups are, for example, aminocarboxylic acids, hydroxycarboxylic acids, more particularly dihydroxy-alkylcarboxylic acids, such as dimethylolpropionic acid, for example, or diol-carboxylic acids with structural similarity thereto. It has emerged that very suitable polyurethanes with carboxyl groups, PUR-COOH, are those of the kind described, for example, as "polymer (PII)" in DE 100 00 656 A1 or WO 01/34559 A1.

Polyurethanes with carboxyl groups and carbodiimide groups, PUR-COOH-CDI, are polyurethanes which as well as carboxyl groups also contain carbodiimide groups —N═C═N—.

Particularly suitable poyurethanes with carboxyl groups and carbodiimide groups, PUR-COOH-CDI, are those which contain the structural element of the formula (I)

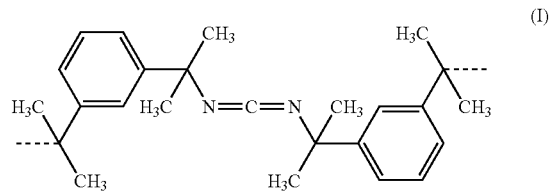

(I)

Compounds of this kind are described, for example, in DE 100 01 777 A1 or as "polymers (Ia)" in EP 1 000 104 B1.

In certain circumstances it has proven advantageous for the polyurethane dispersion composition (PD) and/or the dispersion adhesive (DK) to comprise simultaneously at least one carbodiimide (CDI) and at least one polyurethane with carboxyl groups and carbodiimide groups (PUR-COOH-CDI).

It may also be of advantage for the aqueous dispersion adhesive to comprise simultaneously at least one polyurethane with carboxyl groups and carbodiimide groups (PUR-COOH-CDI) and at least one polyurethane with carboxyl groups (PUR-COOH).

The one-component aqueous polyurethane dispersion composition (PD) and the one-component polyurethane dispersion adhesive (DK) further comprise water. Typically the water fraction is between 70% and 40% by weight, more particularly between 55% and 45% by weight.

The aqueous polyurethane dispersion composition (PD) and more particularly the one-component polyurethane dispersion adhesive (DK) may further comprise at least one copolymer A, which is either an ethylene/vinyl acetate copolymer (EVA) or a copolymer of the monomers ethylene, vinyl acetate, and at least one (meth)acrylate.

Furthermore the one-component aqueous polyurethane dispersion composition (PD) and/or the one-component polyurethane dispersion adhesive (DK) advantageously comprise further constituents. Further constituents are more particularly constituents selected from the group encompassing stabilizers, thickeners, aging inhibitors, fungicides, pigments, dyes, wetting agents, antifoams, matting agents, neutralizing agents, and fillers.

Suitable in principle are those stabilizers of the kind typically used with aqueous dispersions. It has emerged, however, that the use of stabilizers leads to highly storage-stable dispersion adhesives and polyurethane dispersion compositions when the stabilizer is selected from the group encompassing wetting agents, cellulose, polyvinyl alcohol, polyvinylpyrrolidone, and mixtures thereof.

Particular advantage is possessed by dispersion adhesives and polyurethane dispersion compositions which are free from organic solvents, more particularly free from what are called VOCs (volatile organic compounds) and/or plasticizers. Not only plasticizers but also organic solvents are deleterious from the standpoints of ecotoxicology and occupational hygiene. Furthermore, plasticizers can migrate to the surface and lead to failure of an adhesive bond or lead to the surface becoming tacky, which leads to soiling of the bonded joints. Solvents as well are unwanted, since they may entail on the one hand additional hazard potential on heating and during application of the adhesive, and since on the other hand they may likewise migrate and be emitted, over a long time, to the environment and to materials which are in contact with the adhesive, and may adversely affect these materials, and/or may lead to the failure of the adhesive bond.

The preparation of the one-component aqueous polyurethane dispersion composition (PD) and/or of the one-component polyurethane dispersion adhesive (DK) is accomplished in a manner known to the skilled worker for aqueous dispersions and dispersion adhesives, as is disclosed, for example, in WO 2005/113627 A1.

The one-component aqueous polyurethane dispersion composition (PD) is used as a primer for the adhesive bonding of plastic films (KF) by means of an aqueous one-component polyurethane dispersion adhesive (DK).

The term "primer" is used in this document in the definition typically understood by the skilled worker, namely that it refers to a thin layer, typically thinner than 1 millimeter, more particularly between 1 and 200 micrometers, preferably between 1 and 100 micrometers, which is applied to the plastic film (KF) and, after flashing off, is contacted with an adhesive and leads to an improvement in the adhesion of the adhesive to the plastic film.

By "flashing off" throughout this document is meant the drying of an aqueous polyurethane dispersion composition or of an aqueous polyurethane dispersion adhesive after its application, the water undergoing entire or at least majority evaporation. In this document an aqueous polyurethane dispersion composition or an aqueous polyurethane dispersion adhesive which has been flashed off in this way is referred to by PD' or DK' respectively.

By "plastic film" is meant, more particularly, flexible sheetlike plastics in a thickness from 0.05 millimeter to 5 millimeters which can be rolled up. Accordingly, as well as "films" in the strict sense of thicknesses below 1 mm, it also comprehends sealing membranes of the kind typically used to seal tunnels, roofs or swimming pools, in a thickness of typically 1 to 3 mm, or even, in special cases, in a thickness of up to a maximum of 5 mm. Plastic films (KF) of this kind are typically produced by spreading, casting, calendering or extrusion and are typically available commercially in rolls or are produced on site. They may be of single-layer or multilayer construction.

The plastic is preferably a thermoplastic, such as PVC, more particularly plasticized PVC, ethylene/vinyl acetate copolymers (EVA), or thermoplastic polyolefins (TPO), ASA (acrylonitrile/styrene/acrylic ester), PUR (polyurethane), PA (polyamide), poly(meth)acrylates, polycarbonates, PET (polyethylene terephthalate) or polymeric alloys thereof. PVC and thermoplastic polyolefins (TPO) are considered to be particularly preferred.

Accordingly a further aspect of the present invention encompasses a primer-coated plastic film which is obtained by applying and flashing off a one-component aqueous polyurethane dispersion composition (PD) which comprises at least one polyurethane P1 and also carbodiimide groups and/or carboxyl groups to a plastic film (KF). The one-component aqueous polyurethane dispersion composition (PD) and the plastic film (KF) have already been described.

The primer-coated plastic films can be produced in different ways. The application of the aqueous polyurethane dispersion composition (PD) may be accomplished, for example, by a spraying, spreading, knifecoating, stamping, roller application or casting application method. In the case of the spray application of the adhesive—the method used with preference—it is necessary, however, to take account of the problem of what is called overspray. The application is typically applied by means of an application unit.

Following the application of the aqueous polyurethane dispersion composition (PD) it is flashed off, so forming a flashed-off aqueous polyurethane dispersion composition (PD'), which forms a film. This film is referred to as the primer. Flashing off may take place by evaporation in air with and without flash-off means. Flash-off means which can be used include, for example, a fan, more particularly an air fan. It is preferred to use a flash-off means. Flashing off may take place at room temperature or at elevated temperature, more particularly at a temperature below 150° C. Flashing off is accomplished preferably at a low temperature, by means for example of a Carnot process.

The primer-coated plastic film thus produced can then, as required, be cut to length, cut off, rolled up or directly further processed. The rolls of the primer-coated plastic films can then, as required, be stored or transported. It is a key advantage of the primer-coated plastic film described that it can be rolled up without the use of release paper interleaves, since there is no blocking of the rolled-up film even after prolonged storage or transport periods. Thus, for example, the primer-coated plastic film can be coated at the premises of the film manufacturer, before then being stored for a relatively long time and supplied to the plant which then bonds this precoated film to a substrate. Despite this long span of time between coating and processing, it is possible to ensure a faultless adhesive bond. This advantage is especially important on account of the fact that within the industry, particularly in vehicle manufacture, there is a trend apparent in manufacture "away from the line and toward the supplier". This trend is continued in turn between the direct supplier—of car doors, for example—and its supplier—of decorative materials, for example—as well. To a skilled worker it is clear that under certain conditions it may nevertheless be advantageous to use interleaves of a release paper.

The primer-coated plastic films produced are preferably bonded by means of an aqueous dispersion adhesive to form a composite.

Accordingly a further aspect of the present invention relates to a composite and to a method of producing it.

The composite is produced by a method which comprises the following steps
  (i) applying the aqueous polyurethane dispersion composition (PD) to a plastic film (KF)
  (ii) flashing off the polyurethane dispersion composition (PD) to form a flashed-off polyurethane dispersion composition (PD')
  (iii) applying the aqueous polyurethane dispersion adhesive (DK) to the substrate (S)
  (iv) flashing off the aqueous polyurethane dispersion adhesive (DK) to form a flashed-off polyurethane dispersion adhesive (DK')
  (v) heating the plastic film (KF) with the flashed-off polyurethane dispersion composition (PD') thereon
  (vi) contacting the flashed-off polyurethane dispersion adhesive (DK') with the polyurethane dispersion composition (PD') flashed off according to (ii).

Steps (iv) and (v) may in this case take place successively or simultaneously. The aqueous polyurethane dispersion composition (PD) and the aqueous polyurethane dispersion adhesive (DK) have already been described above.

The application of the aqueous polyurethane dispersion adhesive (DK) may be accomplished, for example, by a spraying, spreading, knifecoating, stamping, roller application or casting application method. In the case of the spray application of the adhesive—the method used with preference—it is necessary, however, to take account of the problem of what is called overspray. The dispersion adhesive is typically applied in an amount of 30 to 200 g/m² wet, preferably 60 to 120 g/m² wet, to the surface where bonding is to take place.

In one preferred embodiment the step of contacting (vi) takes place under an applied pressure exerted on the film. This applied pressure is preferably between 0.1 bar and 1 bar, more preferably at least 0.8 bar. This applied pressure is preferably generated by the application of an underpressure between film and substrate, preferably by withdrawal of air under suction from the space between flashed-off polyurethane dispersion adhesive (DK') and flashed-off polyurethane dispersion composition (PD').

On contacting in step (vi), the flashed-off polyurethane dispersion adhesive (DK') preferably has a temperature of 50° C. or more, more particularly a temperature between 50 and 180° C., more preferably between 60 and 80° C.

As a result of the influence of the temperature of 50° C. or more, the carbodiimide groups react via a polyaddition reaction to form N-acylureas with the carboxyl groups. Accordingly the primer, i.e., the flashed-off polyurethane dispersion composition, and the flashed-off polyurethane dispersion adhesive react chemically with one another. After heating, a layer of reacted primer (P) with a layer of reacted adhesive (K) is formed. It is clear to the skilled worker that, depending on the layer thicknesses and methods, the reaction may be complete or incomplete. It is further clear to the skilled worker that in many cases these layers are not clearly delimited from one another, since, according to the chosen combination of composition and adhesive, and also process parameters, it is possible for a transition layer to form by migration, for example. In order to obtain the best possible hardening it is therefore advantageous for at least the aqueous dispersion adhesive (DK), and/or the flashed-off aqueous dispersion adhesive (DK'), and also, where appropriate, the aqueous polyurethane dispersion composition (PD), or the primer, to contain both carbodiimide groups and carboxyl groups, more particularly in the form of a polyurethane polymer with carboxyl groups and carbodiimide groups (PUR-COOH-CDI) or in the form of a polyurethane polymer with carboxyl groups (PUR-COOH-CDI) and of a carbodiimide (CDI).

The substrate (S), often also referred to as support, may be of a variety of kinds. The substrates may be made, for example, of metal, painted metal, of plastic, wood, woodbase materials or fiber materials. The substrate is preferably a solid, shaped body.

The composite thus formed therefore has at least
  one plastic film (KF);
  one reacted primer (P),
  one reacted adhesive (K), and
  one substrate (S).

The reacted primer is obtained in this case from a one-component aqueous polyurethane dispersion composition (PD), and the reacted adhesive is obtained from a one-component aqueous polyurethane dispersion adhesive (DK). Furthermore, the reacted primer (P) is disposed between plastic film (KF) and reacted adhesive (K), and the reacted adhesive (K) is disposed between reacted primer (P) and substrate (S). As already described, the aqueous polyurethane composition (PD) comprises a polyurethane P1 and also carbodiimide groups and/or carboxyl groups, and the polyurethane dispersion adhesive (DK) comprises a polyurethane P2 and also carbodiimide groups and/or carboxyl groups.

These carboxyl groups and carbodiimide groups react on heating to a temperature of 50° C. or more with one another via a polyaddition reaction. Accordingly the reacted primer (P) and reacted adhesive (K) are joined directly to one another by a chemical reaction.

The composite thus formed is preferably an article of industrial manufacture and more particularly is an article for interior fitment. Preferably it is a part for installation in a means of transport or is used in the furniture sector.

Particular importance attaches to the use of the primed plastic film for the production of interior trim parts of vehicles, more particularly of automobiles. Examples of such interior trim parts are door side parts, switch panels, parcel shelves, roof panel linings, sliding-roof panel linings, center consoles, gloveboxes, sun visors, pillars, door handles, arm rests, floor assemblies, loading-floor assemblies, and trunk assemblies, and also sleeping-cab walls and rear walls of vans and trucks.

Used more particularly for this purpose is a vacuum forming process or a press lamination in the sealing process.

In the case of the vacuum forming process, the dispersion adhesive is applied to the substrate S, also referred to as a support. This is followed by flashing off, in the case of the present invention at room temperature or in a drying tunnel at preferably not more than 40° C. Typically the primer-coated film (decorative element of air-impermeable material) is clamped airtightly into a frame. Beneath the film there is a bottom mold, onto which the support is placed. Bottom mold and support have drill holes or are air-permeable. The apparatus is closed off airtightly as well toward its bottom. When the air is withdrawn from this device under suction, the decorative material then conforms accurately to the support component, under the atmospheric pressure bearing on the surface of the decorative material. The decorative material is heated prior to application of the vacuum or underpressure. On account of the vacuum, or underpressure, to be produced, the decorative material is impermeable to air.

In the case of the press lamination process, the adhesive is likewise applied to the support and, where appropriate, to the primer-coated plastic film (decorative element), but at least to the support. This is followed by flashing off, typically at room temperature or in a drying tunnel of preferably not more than 40° C. The bonding of the support to the decorative element is accomplished following thermal activation with joining and pressing.

The primer-coated plastic films utilized here are in many cases decorative films and have a surface structure. This surface structure on the plastic film may be introduced by embossing, for example, before or during or after adhesive bonding.

BRIEF DESCRIPTION OF THE DRAWINGS

In the text below, the invention is illustrated further schematically with reference to drawings. Identical elements in the various figures are given the same reference symbols. Movements are indicated with arrows. The structures shown by the figures are as follows:

FIG. 1a shows a plastic film (KF) to which a one-component aqueous polyurethane dispersion composition (PD) has been applied, before it is flashed off. After the one-component aqueous polyurethane dispersion composition (PD) has been flashed off, a flashed-off aqueous polyurethane dispersion composition (PD') is formed, which is referred to as a primer.

Figure 1A:
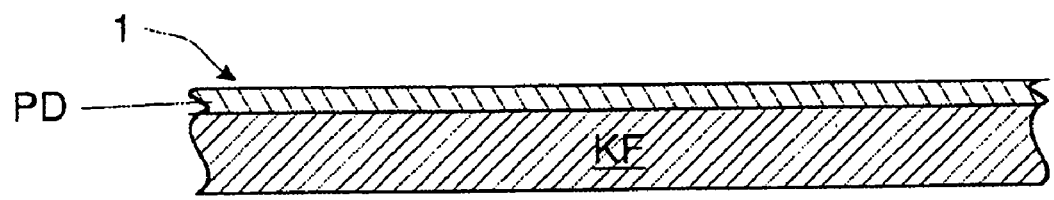
FIG. 1a Cross section through a plastic film (KF) to which a one-component aqueous polyurethane dispersion composition (PD) has been applied FIG. 1b Cross section through a substrate (S) to which a one-component aqueous polyurethane dispersion adhesive (DK) has been applied FIG. 1c Cross section through a composite, after adhesive bonding and heating FIG. 2 Production process for a primer-coated plastic film FIG. 1 describes possible intermediates in the production of a composite.
Figure 1B:
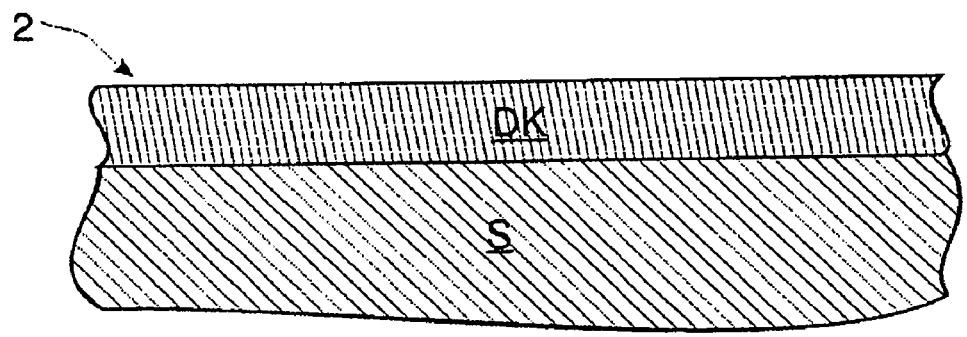
FIG. 1b shows a substrate (S) to which a one-component aqueous polyurethane dispersion adhesive (DK) has been applied, before it is flashed off. After the one-component aqueous polyurethane dispersion adhesive (DK) has been flashed off, a flashed-off aqueous polyurethane dispersion adhesive (DK') is formed.
Figure 1C:
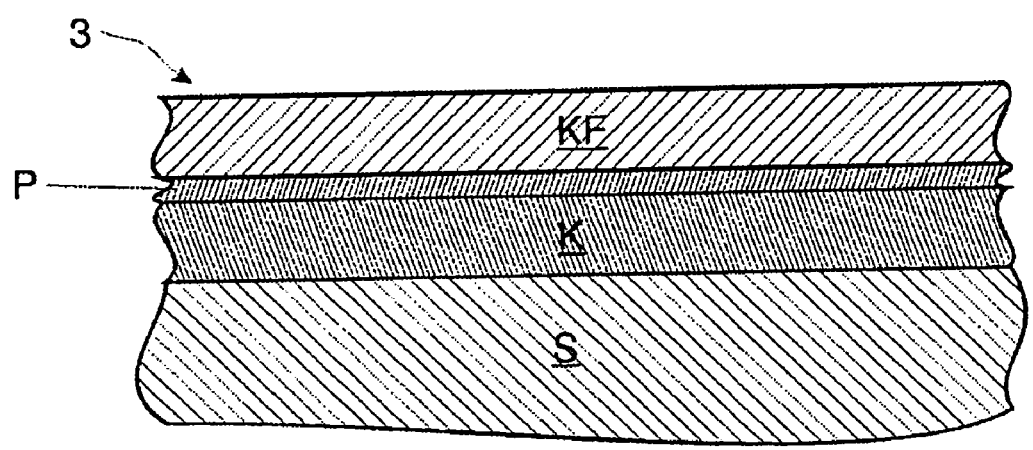
FIG. 1 Structure of a composite and intermediates

The primer-coated plastic film is subsequently joined via the flashed-off adhesive (DK') to the substrate (S) and cured by heating. As a result of the heat, primer and adhesive react, and a composite is formed as shown schematically in FIG. 1c), with a plastic film (KF) which is joined via a reacted primer (P) and a reacted adhesive (K) with the substrate (S). In the preferred embodiment heating is carried out, prior to contacting, through the coated film, so that the latter is plastified and is bonded under pressure to the flashed-off adhesive (DK') located on the substrate (S).

FIG. 2 shows schematically the production of a primer-coated plastic film 1. In the embodiment shown here, the one-component aqueous polyurethane dispersion composition (PD) is applied to the plastic film (KF) by means of applicator unit 4. Here the plastic film is moved beneath the applicator unit 4. Typically the plastic film is unwound from a roll (not shown). Following application, the aqueous polyurethane dispersion composition (PD) is flashed off by means of flash-off means 2 (an air fan, for example). The aqueous polyurethane dispersion composition (PD) flashed off in this way forms a primer on the plastic film. FIG. 2 shows that this primer-coated plastic film is rolled up. Also shown in FIG. 2, in the 5 bottom part, is an enlarged schematic section of a roll 3 with rolled-up primer-coated plastic film. As a result of the rolling-up of the coated plastic film, the individual plies of the primer-coated plastic film 1 are in direct contact with one another and more particularly have no release paper interleaves. As and when required, the primer-coated plastic film, without blocking, even after prolonged storage or transport time, can be unwound from the roll 3.

EXAMPLES

The examples set out below serve to illustrate the invention.

Primer-coated Plastic Films

The primers indicated in Table 1 were applied to PVC film (layer thickness 1.6 mm) by means of a wire doctor, in a layer thickness of approximately 10μ, and flashed off in a drying oven below 50° C. (film temperature).

TABLE 1

| | Primers used |
|---|---|
| Ref. 1 | Commercial polyurethane dispersion primer |
| Ref. 2 | Aqueous polyester polyurethane dispersion primer with sulfonate groups (Dispercoll U, Bayer AG) (polymer fraction 40% by weight) |
| P1 | Aqueous dispersion of a polyester polyurethane elastomer with carboxyl and carbodiimide groups. Viscosity = 50-300 mPas Particle size = about 0.1 μm Fikentscher K value = about 30-60 Film tear strength = 30 N/mm$^2$ Film elongation at break = about 800% Water content = about 60% |

The film coated with the inventive primer P1 could be stored, without release paper interleaves, without blocking occurring.

Preparation of the One-component Aqueous Polyurethane Dispersion Adhesive

The aqueous polyurethane dispersion adhesive was prepared as follows:

50 g of an aqueous dispersion of an ethylene-vinyl acetate copolymer (EVA) (ethylene/vinyl acetate=17%/83%, viscosity (Brookfield RVT 3/20 (ISO 2555))=3800±1000 mPas, pH=4-5, water content: 40±1%) were charged to a stirred vessel. After the pH had been adjusted, by adding aqueous sodium hydroxide solution (0.2 g of 25% NaOH in water), to a level of between 7.5 and 8.5 pH, 50 g of a polyurethane dispersion with carboxyl and carbodiimide groups (viscosity (23° C., 250 s$^{-1}$ in accordance with DIN ISO 976)=50-300 mPas, particle size=about 0.1 μm, Fikentscher k value=about 30-60, film tear strength=about 30 N/mm$^2$, film elongation at break=about 800%, water content: 60%) were introduced with stirring. Subsequently 5 g of an oligocarbodiimide (carbodiimide content (relative to polymer)=about 12%, about 3 mol/kg, viscosity (23° C., 250 s$^{-1}$ in accordance with DIN EN ISO 3219)=10-500 mPas, pH=8-10, water content: 80%) were introduced with stirring. After further stirring for around 20 minutes, the viscosity of the dispersion adhesive was adjusted using 0.2 g of thickener (Borchi® Gel L 75 N, Borchers GmbH) to a viscosity between 5000 and 6000 mPas. The viscosity is measured at 20° C. by means of a Brookfield RVT viscometer with 3/5 rpm spindle. The dispersion adhesive has a water fraction of around 50% by weight.

Composite Production

The above-described aqueous polyurethane dispersion adhesive was applied to a PVC film (layer thickness 1.6 mm) in a wet film thickness of approximately 150 μm and was flashed off at room temperature and bonded in a heat-sealing process (sealing temperature 70° C.) to the primer-coated plastic films.

Adhesive bonding took place with a heated plate press (100° C. plate temperature) within 15 seconds, producing a temperature of 70° C. in the bonded joint.

Test Methods

Heat Resistance in the Peel Stability Test (Duplicate Determination)

For this purpose the test specimens with a width of 2.5 cm were loaded in a heating oven under a weight of 300 g.

In the preheated oven, beginning at a temperature of 80° C., the test specimens were left for an hour, after which, and after each further hour, the temperature in the oven was raised by a further 10° C.

Under this load, the bonded joint opens as a function of time and temperature. The opening distance ("$d_L$") of the bonded joint was measured and reported as $d_L$ (80° C.), $d_L$ (90° C.), $d_L$ (100° C.), $d_L$ (110° C.), and $d_L$ (120° C.). If fracture occurred, the time taken for this to occur was measured. The opening distance and the time provide information on the quality of the adhesive bond.

Resistance in the Climatic Cycling Test (Duplicate Determination)

The manufacture of the test specimens was the same as for the heat resistance test. The test itself was carried out in accordance with the BMW 3.08 test, likewise with 300 g loading. The mandated test profile for this is as follows:

4 h storage at 90° C. (80% relative humidity)
2 h cooling to −30° C. (80% relative humidity)
4 h storage at −30° C. (80% relative humidity)
2 h heating to 90° C. (80% relative humidity)

After one test cycle has been conduced, the opening distance ("$d_B$") was measured. Here as well this distance provides information on the stability in the bond after climatic cycling exposure.

Results: The results are compiled in Tables 2 and 3.

TABLE 2

Heat resistance of composites comprising primer-coated plastic films. The numbers reported refer in each case to the first and second measurements respectively.

| Primer used for coating | Ref. 1 | Ref. 2 | P1 |
|---|---|---|---|
| $d_L$ (80° C.) [mm] | 9/20 | 15/11 | 1/0 |
| $d_L$ (90° C.) [mm] | 30/75 | 95/87 | 2/2 |

TABLE 2-continued

Heat resistance of composites comprising primer-coated plastic films. The numbers reported refer in each case to the first and second measurements respectively.

| Primer used for coating | Ref. 1 | Ref. 2 | P1 |
|---|---|---|---|
| $d_L$ (100° C.) [mm] | Fracture: 20 min/9 min | Fracture: 3 min/7 min | 5/6 |
| $d_L$ (110° C.) [mm] | | | 9/11 |
| $d_L$ (120° C.) [mm] | | | 15/19 |

TABLE 3

Resistance in the climatic cycling test of composites comprising primer-coated plastic films. The numbers reported refer in each case to the first and second measurements respectively.

| Primer used for coating | Ref. 1 | Ref. 2 | P1 |
|---|---|---|---|
| $d_B$ [mm] | Fracture | Fracture | 28/32 |

The results clearly show the advantages of the invention, with the composites exhibiting massively improved behavior in respect of heat resistance and climatic cycling resistance.

| | List of reference numerals |
|---|---|
| 1 | primer-coated plastic film |
| 2 | flash-off means |
| 3 | roll of rolled-up primer-coated plastic film |
| 4 | applicator unit |
| KF | plastic film |
| PD | polyurethane dispersion composition |
| PD' | flashed-off polyurethane dispersion composition |
| DK | aqueous polyurethane dispersion adhesive |
| DK' | flashed-off aqueous polyurethane dispersion adhesive |
| P | reacted primer |
| K | reacted adhesive |

The invention claimed is:

1. A method for an adhesive bonding of plastic films (KF) comprising:
priming a plastic film (KF) by applying a one component aqueous polyurethane dispersion composition (PD), containing a polyurethane P1 and at least one of carbodiimide groups and carboxyl groups, to the plastic film (KF);
applying a polyurethane dispersion adhesive (DK) to the plastic film (KF) after priming; and
allowing a polyurethane of the polyurethane dispersion adhesive (DK), comprising a polyurethane P2 and at least one of carbodiimide groups and carboxyl groups, to react with the polyurethane P1 of the one component aqueous polyurethane dispersion composition (PD), wherein
the reaction is a polyaddition reaction that occurs on heating to a temperature of 50° C. or more, and
the one component aqueous polyurethane dispersion composition (PD) contains at least one different chemical element or chemical group than the polyurethane dispersion adhesive (DK).

2. The method of claim 1, wherein the carbodiimide group is present in at least one of the one component aqueous polyurethane dispersion composition (PD) and the polyurethane dispersion adhesive (DK) and is represented by formula (I):

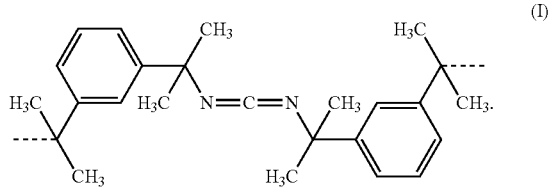 (I)

3. The method of claim 1, wherein the polyurethane dispersion composition (PD) contains carbodiimide groups which are present in incorporated form in the polyurethane P1.

4. The method of claim 1, wherein the polyurethane dispersion composition (PD) contains carboxyl groups which are attached to the polyurethane P1.

5. The method of claim 1, wherein the polyurethane P2 present in the aqueous polyurethane dispersion adhesive (DK) is a polyurethane (PUR-COOH-CDI) which contains both carboxyl groups and carbodiimide groups.

6. The method of claim 5, wherein the aqueous polyurethane dispersion composition (PD) comprises at least one carbodiimide (CDI) which contains at least one carbodiimide group.

7. The method of claim 1, wherein the aqueous polyurethane dispersion adhesive (DK) comprises as polyurethane P2 a polyurethane (PUR-COOH) which contains carboxyl groups and
 further comprises at least one carbodiimide (CDI) which contains at least one carbodiimide group.

8. The method of claim 1, wherein
 one of the one component aqueous polyurethane dispersion composition (PD) and the polyurethane dispersion adhesive (DK) contains only one of carbodiimide groups and carboxyl groups, and
 the other of the one component aqueous polyurethane dispersion composition (PD) and the polyurethane dispersion adhesive (DK) contains only the other of carbodiimide groups and carboxyl groups.

9. The method of claim 1, wherein
 one of the one component aqueous polyurethane dispersion composition (PD) and the polyurethane dispersion adhesive (DK) contains both carbodiimide groups and carboxyl groups,
 the other of the one component aqueous polyurethane dispersion composition (PD) and the polyurethane dispersion adhesive (DK) contains only one of carbodiimide groups and carboxyl groups, and
 the one of the one component aqueous polyurethane dispersion composition (PD) and the polyurethane dispersion adhesive (DK) that contains both carbodiimide groups and carboxyl groups has a stoichiometric excess of the carbodiimide groups or carboxyl groups that is not contained in the other of the one component aqueous polyurethane dispersion composition (PD) and the polyurethane dispersion adhesive (DK).

10. The method of claim 1, wherein
 both of the one component aqueous polyurethane dispersion composition (PD) and the polyurethane dispersion adhesive (DK) contain both carbodiimide groups and carboxyl groups,
 one of the one component aqueous polyurethane dispersion composition (PD) or the polyurethane dispersion adhesive (DK) has a stoichiometric excess of carbodiimide groups, and
 the other of the one component aqueous polyurethane dispersion composition (PD) or the polyurethane dispersion adhesive (DK) has a stoichiometric excess of carboxyl groups.

* * * * *